(12) United States Patent
Uchiyama et al.

(10) Patent No.: US 7,170,547 B2
(45) Date of Patent: Jan. 30, 2007

(54) STEREOSCOPIC IMAGE-TAKING LENS APPARATUS, STEREOSCOPIC IMAGE-TAKING SYSTEM AND IMAGE-TAKING APPARATUS

(75) Inventors: Minoru Uchiyama, Tochigi (JP); Toru Ohara, Tochigi (JP); Tomoaki Yamanaka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/462,897

(22) Filed: Aug. 7, 2006

(65) Prior Publication Data

US 2006/0268152 A1    Nov. 30, 2006

Related U.S. Application Data

(62) Division of application No. 10/273,779, filed on Oct. 18, 2002.

(30) Foreign Application Priority Data

Oct. 18, 2001    (JP)    ............................. 2001-320892

(51) Int. Cl.
  *H04N 13/02*    (2006.01)
  *H04N 15/00*    (2006.01)
  *H04N 5/232*    (2006.01)
  *H04N 5/225*    (2006.01)
  *G02B 27/22*    (2006.01)

(52) U.S. Cl. .................... 348/49; 348/340; 348/211.14; 359/462

(58) Field of Classification Search ................ 348/49, 348/211.14, 42, 294, 45, 46, 344; 359/462; 382/154
See application file for complete search history.

(56) References Cited

U.S. PATENT DOCUMENTS

| 4,855,814 | A | 8/1989 | Shiraishi et al. | |
|---|---|---|---|---|
| 6,314,248 | B1 * | 11/2001 | Ohmura et al. | ............. 396/429 |
| 6,545,741 | B2 | 4/2003 | Meltzer | |
| 6,862,140 | B2 * | 3/2005 | Ogino | ........................ 359/473 |
| 6,864,910 | B1 * | 3/2005 | Ogino et al. | ................... 348/42 |
| 6,888,563 | B2 * | 5/2005 | Suzuki et al. | .................. 348/42 |
| 6,999,125 | B2 * | 2/2006 | Fujiwara et al. | ............ 348/362 |

* cited by examiner

*Primary Examiner*—Ngoc-Yen Vu
*Assistant Examiner*—Gregory Madden
(74) *Attorney, Agent, or Firm*—Morgan & Finnegan, LLP

(57) ABSTRACT

A stereoscopic image-taking lens apparatus according to the present invention is attachable to an image-taking apparatus provided with an image-pickup element; wherein a shutter is changed over so that lights from the right and left optical paths are guided alternately to the image-pickup element at every predetermined time, so that parallax images are formed in time sequence on the image-pickup element. Furthermore, the stereoscopic image-taking lens apparatus sends a signal for inhibiting an image-taking operation in which the charge-storage time of the image-pickup element is longer than the predetermined time for changing over the shutter to the image-taking apparatus. Furthermore, the lens device sends a signal for changing the set allowance of a white balance to the image-taking apparatus.

11 Claims, 8 Drawing Sheets

STEREOSCOPIC IMAGE-TAKING LENS APPARATUS, STEREOSCOPIC IMAGE-TAKING SYSTEM AND IMAGE-TAKING APPARATUS

This application is a divisional application of co-pending U.S. patent application Ser. No. 10/273,779, filed Oct. 18, 2002, which is herein incorporated by reference in its entirety.

BACKGROUND OF THE INVENTION

1. Field of the Invention

The present invention relates to a stereoscopic image-taking lens apparatus attached to a image-taking apparatus which enables exchange of lenses for image-taking parallax images which can be observed in stereoscopic vision, a stereoscopic image-taking system and an image-taking apparatus.

2. Description of the Related Art

A stereoscopic image-taking apparatus for performing stereoscopic vision image-taking of a so-called field sequential method has right and left optical paths, and shutters such as liquid crystal shutters or the like provided in these optical paths, so that right and left parallax images are taken by an image-pickup element by alternately changing a transparent state and a nontransparent state of the shutters. The parallax images which are taken in this manner can be observed by the observer as a stereoscopic image by using a special observing apparatus.

FIG. 8 shows a structure of a stereoscopic image-taking apparatus of the field sequential method. In this figure, reference numeral 801 denotes a focus lens for performing a focus adjustment which is driven by a focus drive circuit 816. Reference numeral 802 denotes a zoom lens for performing a magnification operation which is driven by a zoom drive circuit 817. Reference numeral 803 denotes a correcting lens for a temperature focus correction and a flange back adjustment, which is driven by the correction drive circuit 818.

Reference numerals 804 and 805 denote right and left object mirrors which can be rotated so as to adjust the direction (vergence) of the right and left optical axes. Reference numerals 806 and 807 denote right and left first lens units, and reference numerals 808 and 809 denote right and left shutters. The shutters 808 and 809 are driven by a shutter drive circuit 820 and repeat the opening and closing operation (a transparent state and a nontransparent state in the liquid crystal shutters) alternately at an appropriate period.

Reference numeral 810 denotes a prism which composes optical axes of the light fluxes which are incident through the first lens units 806 and 807, and shutters 808 and 809, respectively, from the right and left object mirrors 804 and 805. As a consequence, the light flux incident from the right and left object mirrors 804 and 805 alternately forms an image on a common image-pickup surface.

Reference numeral 811 denotes an IRIS for making an aperture adjustment and the IRIS 811 is driven with an IRIS drive circuit 815. Reference numeral 812 denotes a second lens unit.

Reference numerals 813 and 814 denote encoders which detect the positions of the focus lens 801 and the zoom lens 802 respectively.

Reference numeral 819 denotes a rangefinding circuit for detecting the distance to an object. This detection signal is sent to the microcomputer 825 which will be described later, and the microcomputer 825 rotates the object mirrors 804 and 805 in accordance with the distance to the object so as to adjust the vergence.

Reference numeral 821 denotes an image-pickup element such as a CCD or the like arranged on the image-pickup surface, and the image-pickup element 821 is driven with the CCD drive circuit 822. Reference numeral 823 denotes an amplifying circuit for amplifying the image signal which is an output of the image-pickup element 821.

Reference numeral 824 denotes a signal processing circuit for processing a signal for white balance, AF, AE or the like and for producing a video signal. Reference numeral 825 denotes a microcomputer which carries out control of the whole apparatus such as the shutters 808 and 809, drive circuits 815 to 817, a signal processing circuit 824 or the like.

This stereoscopic image-taking apparatus is prepared only for the purpose of performing the stereoscopic image-taking. The apparatus is configured in such a manner that a stereoscopic image can be taken with a signal processing system and an apparatus control system (the microcomputer 825) that are exclusively dedicated to the stereoscopic image-taking.

Furthermore, in recent years, a stereoscopic (3D) image-taking lens having a image-taking optical system ranging from the right and left object mirrors 804 and 805 to the correcting lens 803 as shown in FIG. 8, and being attachable to a camera for performing a general 2D image-taking has been proposed.

However, in the case where a 3D image-taking lens is attached to a camera for performing the 2D image-taking, various disadvantages arise.

For example, in some cameras, a so-called slow shutter mode (a mode in which the charge storage time of the image-pickup element is set to, for example, 1/30 of a second or 1/15 of a second which is slower than 1/60 of a second which is regulated by the NTSC method) can be selected. In the case where the 3D image-taking lens is attached to be used with such a camera, the right and left parallax images are taken as a mixed image without being separated from each other, so that an appropriate stereoscopic image cannot be obtained.

Furthermore, since a color difference resulting from an optical error of the right and left object optical paths (for example, a slight color difference of the right and left shutters) and a deviation of images resulting from a parallax are present on images which are formed on the image-pickup element by the right and left optical paths, there is a possibility that white extraction cannot be appropriately carried out by the same method as at the time of 2D image-taking in the case where the white balance setting control is performed on the basis of the image signal of the image formed with these right and left object optical paths.

SUMMARY OF THE INVENTION

An object of the present invention is to provide a stereoscopic image-taking lens apparatus, a stereoscopic image-taking system, and an image-taking apparatus which can carry out alternate image-taking of appropriate parallax images with right and left optical paths and achieve an appropriate setting of the white balance despite optical errors in the right and left optical paths.

A stereoscopic image-taking lens apparatus of the present invention which is attachable to an image-taking apparatus provided with an image-pickup element comprises of an optical system which forms right and left optical paths for guiding light from an object, which has entered the right and left optical paths, to the image-pickup element; a shutter which is changed over so as to guide the lights which have respectively entered the right and left optical paths alternately to the image-pickup element a control circuit which changes over the shutter in such a manner that light is guided alternately from the right and left optical paths to the image-pickup element at every predetermined times so as to allow the optical system to form parallax images in time sequence on the image-pickup element; and a communication circuit for performing communications with the image-taking apparatus.

Herein, the control circuit sends a signal for inhibiting an image-taking operation in which the charge-storage time of the image-pickup element is longer than the predetermined time for changing over the shutter to the image-taking apparatus via the communication circuit.

For example, in the case where an operation switch for allowing the user to select charge-storage time of the image-pickup element is provided on the image-taking apparatus, the control circuit sends to the image-taking apparatus a signal for inhibiting a selection of the charge-storage time which is longer than the predetermined time for changing over the shutter in accordance with an operation of the operation switch.

Furthermore, the predetermined time for changing over the shutter may be set to time (for example, periodic time of the vertical synchronous signal of the taken image) which is regulated, for example, by the color television method.

Furthermore, a stereoscopic image-taking system of the present invention is configured by comprising the above-mentioned stereoscopic image-taking lens apparatus and an image-taking apparatus which has an image-pickup element and on which the stereoscopic image-taking lens apparatus is mounted. This image-taking apparatus inhibits image-taking operation in which the charge-storage time of the image-pickup element is longer than the predetermined time for changing over the shutter in the stereoscopic image-taking lens apparatus in accordance with an inhibition signal sent from the control circuit of the stereoscopic image-taking lens apparatus.

Furthermore, the stereoscopic image-taking lens apparatus of the present invention which is attachable to an image-taking apparatus provided with an image-pickup element and a function of automatically setting a white balance of the taken image in a predetermined set allowance comprises of an optical system which forms right and left optical paths for guiding light from an object, which has entered the right and left optical paths, to the image-pickup element; a shutter which is changed over for guiding lights which have respectively entered the right and left optical paths to the image-pickup element; a control circuit which changes over the shutter so that lights from the right and left optical paths are alternately guided to the image-pickup element to allow the optical system to form in time sequence parallax images on the image-pickup element; and a communication circuit for performing communications with the image-taking apparatus.

Herein, the control circuit sends to the image-taking apparatus a signal for changing the set allowance of the white balance.

Furthermore, the stereoscopic image-taking system of the present invention is configured by comprising the above-mentioned stereoscopic image-taking lens apparatus and an image-taking apparatus on which the stereoscopic image-taking lens apparatus is mounted. Then, the image-taking apparatus changes the set allowance of the white balance in accordance with a change signal sent from the control circuit of the stereoscopic image-taking lens apparatus.

Furthermore, an image-taking apparatus of the present invention comprises of an image-pickup element; an optical system which forms right and left optical paths for guiding light from an object, which has entered the right and left optical paths, to the image-pickup element; a shutter which is changed over for guiding lights which have respectively entered the right and left optical paths alternately to the image-pickup element; and a control circuit which changes over the shutter so that lights from the right and left optical paths are guided alternately to the image-pickup element at every predetermined time to allow the optical system to form parallax images in time sequence on the image-pickup element at the time of 3D image-taking, and does not change over the shutter to allow the optical system to guide light incident from one of the right and left optical paths to the image-pickup element at the time of 2D image-taking.

Herein, the control circuit allows, at the time of 2D image-taking, image-taking operation in which the charge-storage time of the image-pickup element becomes delayed rather than the opening time of the shutter, and the control circuit inhibits, at the time of 3D image-taking, image-taking operation in which the charge-storage time of the image-pickup element becomes delayed rather than the opening time of the shutter.

Furthermore, an image-taking apparatus of the present invention is provided with a function of automatically setting the predetermined set allowance of a white balance of a taken image, comprises of an image-pickup element; an optical system which forms right and left optical paths for guiding light from an object, which has entered the right and left optical paths, to the image-pickup element; a shutter which is changed over for guiding lights which have respectively entered the right and left optical paths alternately to the image-pickup element; and a control circuit which changes over the shutter so that lights from the right and left optical paths are alternately guided to the image-pickup element to allow the optical system to form parallax images in time sequence on the image-pickup element at the time of 3D image-taking, and does not change over the shutter at the time of 2D image-taking to allow the optical system to guide light incident from one of the right and left optical paths to the image-pickup element.

Herein, the control circuit changes, at the time of 3D image-taking, the set allowance of the white balance for the time of 2D image-taking.

A detailed configuration of the stereoscopic image-taking lens apparatus, stereoscopic image-taking system and image-taking apparatus of the present invention, the previous and following objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Figure 1:
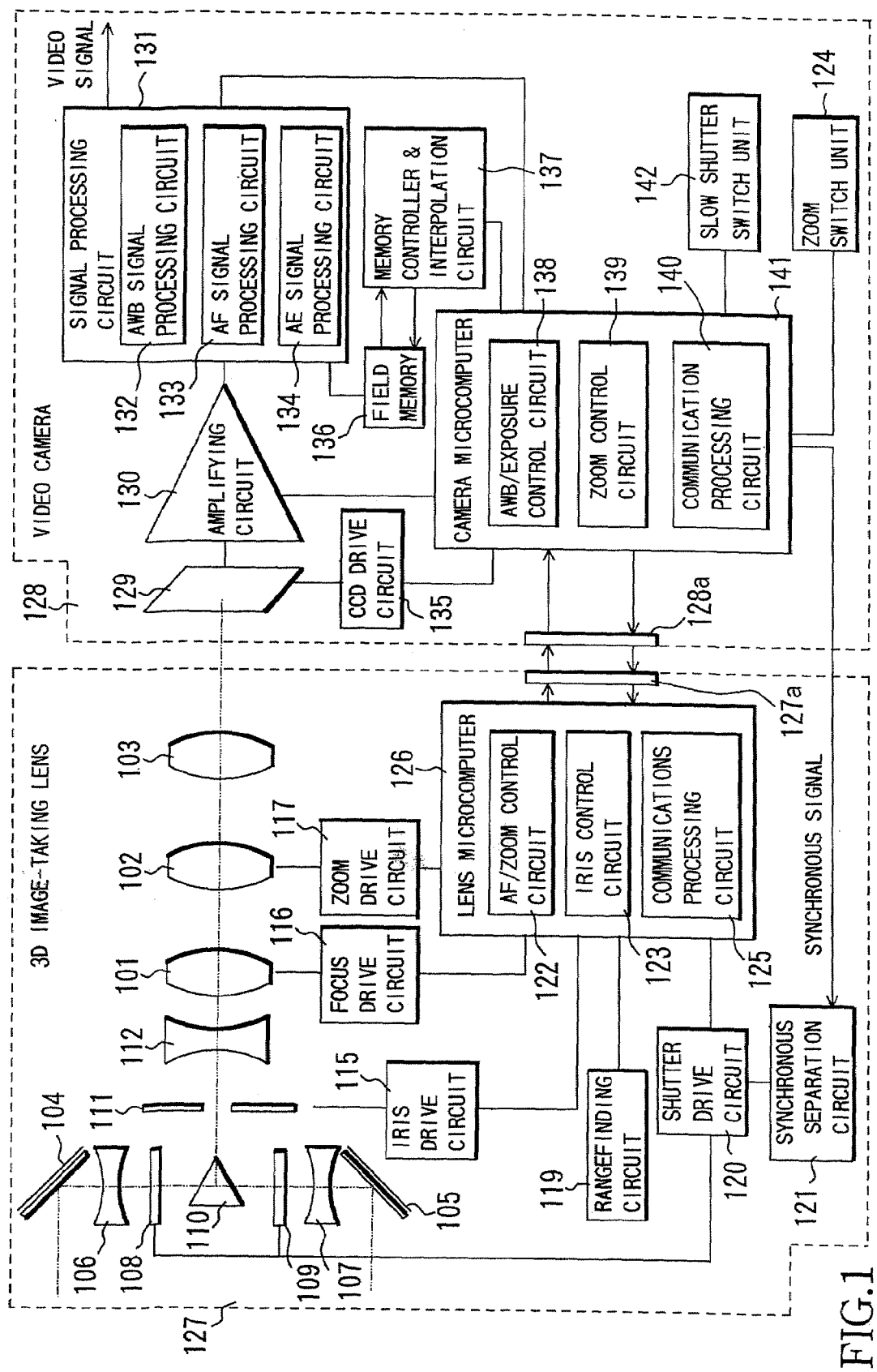
FIG. 1 is a block diagram showing the construction of a stereoscopic image-taking system according to Embodiment 1 of the present invention.

FIG. 1 is a view showing a structure of a stereoscopic image-taking system according to Embodiment 1 of the present invention. This stereoscopic image-taking system comprises of a stereoscopic (3D) image-taking lens apparatus 127 and a video camera 128 as an image-taking apparatus to which the lens apparatus 127 is temporarily attached.

The lens apparatus 127 and the video camera 128 constitute a stereoscopic image-taking system which enables temporary attachment of the lens and mutual communications with mechanical connection of unillustrated mounts and electrical contact of the contact blocks 127a and 128a which are regulated in a predetermined format.

The contact block 127a of the lens apparatus 127 and the contact block 128a of the camera 128 come into mutual contact by placing the lens mount on the camera mount. As a consequence, the lens microcomputer 126 and the camera microcomputer 141 as control circuits can perform the predetermined data communications in accordance with the predetermined format. Furthermore, electric power is supplied from the camera 128 to the lens apparatus 127 via the contact blocks 128a and 127a.

The image-taking optical system of the lens apparatus 127 forms right and left optical paths. The front side optical system out of the image-taking optical system comprises of right and left object mirrors 104 and 105, and right and left first lens units 106 and 107, right and left liquid crystal shutters 108 and 109, and a prism 110.

Light rays from an object respectively entering the right and left optical paths are reflected by the object mirrors 104 and 105 to pass through the first lens units 106 and 107 to alternately reach the prism 110 with an alternate opening and closing (transparent and nontransparent) operation of the liquid crystal shutters 108 and 109, respectively.

Here, the liquid crystal shutters 108 and 109 cannot allow the incident light in the transparent state to completely transmit therethrough, so that a small amount of shielded light exists. On the other hand, in the nontransparent state, the incident light cannot be shielded completely, so that some amount of transmitting light exists. However, in the present embodiment, the state in which a majority of incident light is allowed to transmit therethrough is referred to as a transparent state or an open state while the state in which a majority of incident light is shielded is referred to as a nontransparent state or a closed state.

Furthermore, drive of object mirrors 104 and 105 is controlled by a lens microcomputer 126 by means of a motor in accordance with a distance to the object detected with the rangefinding circuit 119. As a consequence, the vergence of the right and left optical axes is adjusted in accordance with the distance to the object. Furthermore, in accordance with the distance to the object which is detected with the rangefinding circuit 119, drive of the focus lens is controlled by the lens microcomputer 126 by means of the motor, so that the focus is adjusted in accordance with the distance to the object.

The right and left light fluxes which have reached the prism 110 are reflected by the prism 110 and have a common optical axis so as to be incident on the rear side optical system out of the image-taking optical system. This rear side optical system comprises of an IRIS 111 for adjusting light amount, a second lens unit 112 which is fixed, a focus lens 101 which is the third lens unit for focusing, a zoom lens 102 which is the fourth lens unit for changing magnification, and a correcting lens 103 which is the fifth lens unit for performing a temperature focus correction and a flange back adjustment.

The light emitted from the lens apparatus 127 through the correcting lens 103 forms an image on an image-pickup element 129 such as a CCD or the like, provided in the camera 128. The image-pickup element 129 photo-electrically converts an optical image and outputs image signals in accordance with color components such as red, green and blue.

The image signals of respective color components which are output from the image-pickup element 129 are amplified to an appropriate level, respectively, at the amplifying circuit 130 to be input to the signal processing circuit 131. At the signal processing circuit 131, the input image signals are converted to standard color television signals. Furthermore, the image signals are input to the AWB (auto white balance) signal processing circuit 132 provided inside of the signal processing circuit 131, and an AF (auto focus) signal processing circuit 133 and an AE (auto exposure) signal processing circuit 134.

The AWB signal processing circuit 132 creates a color difference signal SAWB from the input image signal. This color difference signal SAWB is supplied to the AWB/exposure control circuit 138 inside of the camera microcomputer 141 for generally controlling the system. The AWB/exposure control circuit 138 controls the amplifying circuit 130 so as to set the color difference signal SAWB to zero to control the setting of the white balance while sending the control information to the lens microcomputer 126.

Furthermore, the AE signal processing circuit 134 creates a photometric signal SAE from the input image signal. This photometric signal SAE is sent to the AWB/exposure control circuit 138 and used for the exposure control. Furthermore, a photometric region controlling command for selectively photometering only a partial region within the image-taking field is sent to the AE signal processing circuit 134.

The AWB/exposure control circuit 138 performs the exposure control, whereby the CCD drive circuit 135 is driven to control the charge-storage time of the image-pickup element 129 and the gain of the amplifying circuit 130 so that the exposure state of the photometric signal is set to a desired state. Furthermore, the AWB/exposure control circuit 138 sends an aperture stop drive command to the IRIS control circuit 123 of the lens microcomputer 126. The IRIS drive circuit 115 controls the opening and closing of the IRIS 111 in accordance with the aperture stop drive command. Furthermore, the IRIS control circuit 123 detects the amount of light passing through the IRIS 111 and an actual movement of the IRIS 111 to perform the feed-back loop control of the IRIS 111.

The feed-back loop control of the IRIS 111 is performed in such a manner that the IRIS drive circuit 115 drives the unillustrated IG meter in accordance with the aperture stop drive command sent from the camera 128, the aperture state is detected by an unillustrated encoder, and the output signal from the encoder is transmitted to the AWB/exposure control circuit 138 in the camera microcomputer 141.

Furthermore, the AWB/exposure control circuit 138 also controls a slow shutter function which is used at the time of image-taking of an object having a low illuminance. That is, the AWB/exposure control circuit 138 controls the CCD drive circuit 135 in accordance with a slow shutter speed which is selected by a slow shutter switch unit (operation switch) 142 provided on the camera 128. The charge-storage time (electronic shutter speed) of the image-pickup element 129 is changed to be longer than the normal charge-storage time which is regulated in the color television method (1/60 of a second in the NTSC method and 1/50 of a second in the PAL method) charge-storage time, whereby the image signal is intermittently extracted by synchronizing a reading period thereto. Incidentally, the charge-storage time changes with the electronic shutter, however, the read-out cycle is constant.

The read intermittent image signal is taken into a field memory 136 as a video signal through the signal processing circuit 131. Then, the AWB/exposure circuit 138 controls the memory controller and an interpolation circuit 137 to transfer the video signal which is stored in the field memory 136 to the signal processing circuit 131 to compensate for the video signal in the field in which the read-out cycle period is omitted.

The AWB/exposure control circuit 138 controls the exposure and the slow shutter, and sends electronic shutter information as exposure information, amplification rate information such as AGC, aperture control information, selected program mode information, and read-out cycle information at the time of the slow shutter to the lens microcomputer 126.

In the case where the automatic focus adjustment is made at the time of 3D image-taking, the lens microcomputer 126 uses a signal from the rangefinding circuit 119 provided on the lens apparatus 127 to measure a distance to the object by a trigonometrical survey method. The AF/zoom control circuit 122 in the lens microcomputer 126 outputs a control signal on the basis of the data sent from the AF signal processing circuit 133 in the camera 128 to the focus drive circuit 116 and drives the focus lens 101. The position information of the focus lens 101 can be detected by an unillustrated encoder to drive the focus lens 101 at a position where the object is focused. An appropriate AF operation can be conducted by performing this sequence of feed-back loop controls.

Furthermore, the camera microcomputer 141 sends the control data calculated at the zoom control circuit 139 on the basis of the tele-/wide data from the zoom switch unit 124 provided on the camera 128, to the lens microcomputer 126.

The AF/zoom control circuit 122 in the lens microcomputer 126 sends a control signal to the zoom drive circuit 117 so as to drive the zoom lens 102 in a direction in which the tele-/or wide switch is pressed in the zoom switch unit 124 on the basis of the control data from the camera microcomputer 141. Thereby, the zoom lens 102 is driven. As a consequence, a changing magnification operation is performed. The position of the zoom lens 102 can be detected by an unillustrated encoder, so that feed-back driving can also be performed.

Furthermore, a vertical synchronous signal of the taken image is output from the camera microcomputer 141, and is input to the synchronous separation circuit 121 provided on the lens apparatus 127. The synchronous separation circuit 121 creates a desired trigger signal by separating the input vertical synchronous signal and sends the trigger signal to the shutter drive circuit 120.

This trigger signal and a right and left identification signal created by the lens microcomputer 126 are input to the shutter drive circuit 120. The shutter drive circuit 120 controls the shutters 108 and 109 in such a manner that the circuit 120 subjects one of the two shutters 108 and 109 to an open (transparent) operation while subjecting the other shutter to a close (nontransparent) operation. As a consequence, images formed by lights through the right and left optical paths are alternately formed on the image-pickup element 129, so that the right and left parallax images are alternately formed on the image-pickup element 129. That is, a stereoscopic image-taking operation by means of the field sequential method is performed in which the right and left parallax images are formed at every time cycle of the vertical synchronous signal (1/60 of a second in the NTSC format and 1/50 of a second in the PAL format).

Furthermore, 2D image-taking operation can be performed in the state in which one of the shutters 108 and 109 is closed whereby the change-over between 2D and 3D can be easily performed.

Although, in this embodiment, the camera microcomputer 141 outputs a vertical synchronous signal, a video signal output from the signal processing circuit 131 can be made as a vertical synchronous signal.

Both the communications processing circuit 125 of the lens microcomputer 126 and the communications processing circuit 140 of the camera microcomputer 141 perform communications for each of the image-taking fields (60 times in one second in the NTSC format and 50 times in one second in the PAL format). A slow shutter inhibition operation in the lens apparatus 127 and in the camera 128 at this time will be explained by using a flowchart shown in FIG. 2.

Figure 2:
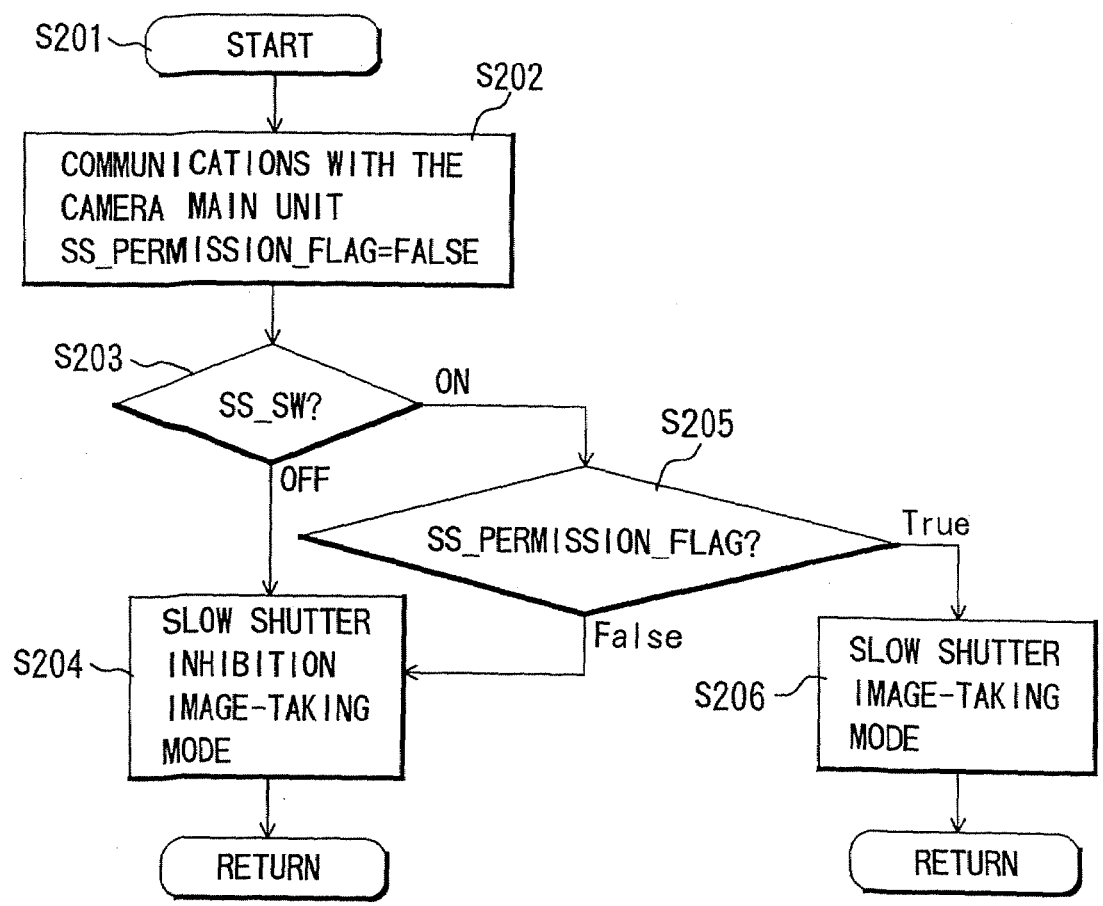
FIG. 2 is a flowchart showing an operation sequence in the stereoscopic image-taking system according to Embodiment 1 of the present invention.

When the power of the camera 128 is turned on, and power is then supplied to the lens apparatus 127, the sequence is started from the step (abbreviated as S) 201 of FIG. 2. First, at step 202, the lens microcomputer 126 sends the FALSE data of the SS_PERMISSION_FLAG to the camera microcomputer 141. This data is sent for each of the image-taking fields. This data is binary data for setting the slow shutter to be either effective or ineffective. In the case of FALSE, this data is used for inhibiting the slow shutter.

Next, at step 203, the camera microcomputer 141 judges whether or not the slow shutter switch (SS_SW) unit 142 is turned on. When the SS_SW is turned on, the process moves to the processing of step 205. Furthermore, in the case where SS_SW is turned off, the process moves to the processing of step 204.

At step 205, the camera microcomputer 141 judges the value of the SS_PERMISSION_FLAG sent from the lens microcomputer 126 to move to the processing of step S204 in the case of FALSE.

At step S204, the slow shutter inhibition image-taking mode is set, the image-taking operation is performed in which the charge-storage time of the image-pickup element 129 is normal charge-storage time (1/60 of a seconds in the NTSC format (S1/60 as a shutter speed), 1/50 of a second in the PAL format (S1/50 as a shutter speed)) or a time shorter than the normal charge-storage time (at a high shutter speed). That is the slow shutter image-taking operation is inhibited in which the charge-storage time of the image pick-up element 129 is longer than the normal charge-storage time. Then, the process returns to the processing of step S201.

Furthermore, the slow shutter image-taking mode of step 206 is provided when the SS_PERMISSION_FLAG is TRUE at step S205, so that the image-taking operation is performed in which the charge-storage time of the image-pickup element 129 is longer than the normal charge-storage time (at a slow shutter speed). charge-storage time.

In the case where the 3D image-taking lens apparatus 127 is connected to the camera 128, since the SS_PERMISSION_FLAG is always FALSE, the slow shutter inhibition image-taking mode is always set at step S204.

Furthermore, the processing of step 206 is performed in the case where the 2D image-taking lens apparatus is mounted instead of the 3D image-taking lens apparatus according to the present embodiment. In the case where the 2D image-taking lens apparatus is mounted, the SS_PERMISSION_FLAG is always set to TRUE, so that the slow shutter image-taking mode can be set by the operation of the slow shutter switch unit 142.

Here, the slow shutter SW unit 142 variably sets the charge-storage time of the image-pickup element 129 every time the slow shutter switch unit 142 is operated. For example, the charge storage interval at the time of the slow shutter can be changed to S1/8 (eight frames per one second, namely, charge-storage time which is 7.5 times longer than normal charge-storage time), S1/15 and S1/30 in the NTSC format. Furthermore, in the PAL format, the slow shutter can be changed to S1/6 (six frames per one second, namely, charge-storage time which is 10 times longer than the normal charge-storage time), S1/12 and S1/25.

The selection of these electronic shutter speeds is inhibited in the slow shutter inhibition image-taking mode. That is, in the slow shutter inhibition image-taking mode, even when the slow shutter switch unit 142 on the side of the camera 128 is operated, these electronic shutter speeds cannot be set.

However, the effect of the high speed electronic shutter for shortening the charge-storage time of the image-pickup element 129 contrary to the slow shutter does not extend over one field (60 frames per one second in the NTSC format, and 50 frames per one second in the PAL format) in 3D image-taking, so that cross talk which is a phenomenon in which the right and left parallax images are mixed and taken does not occur. Consequently, it is not required to inhibit the setting of such high speed shutter speed in the slow shutter inhibition image-taking mode.

This high speed shutter speed can be selected from S1/100 (100 frames per one second, namely, storage time which is ⅗ of the normal charge-storage time), S1/250, S1/500, S1/1000, S1/2000, S1/4000, S1/8000, and S1/15000 in the NTSC format while the shutter speed can be selected from S1/120 (120 frames per one second, namely storage time which is a half of the normal charge-storage time), S1/250, S1/500, S1/1000, S1/2000, S1/4000, S1/8000 and S1/16000 in the PAL format.

As has been explained above, according to Embodiment 1, even when image-taking operation is attempted at a slow shutter mode with the camera attached to this stereoscopic image-taking lens apparatus, such image-taking operation can be inhibited without fail. Consequently, an appropriate stereoscopic image can be obtained at all times.

Furthermore, in the present embodiment, a stereoscopic image-taking lens apparatus using liquid crystal shutters has been explained. However, the present invention can be applied to a stereoscopic image-taking lens apparatus using a mechanical shutter (or shutters).

Furthermore, in the present invention, the stereoscopic image-taking system which enables exchange of the stereoscopic image-taking lens apparatus has been explained. However, the present invention can be applied to an image-taking apparatus of the type integrated with the stereoscopic image-taking lens. In this case, 2D image-taking operation is performed by the inhibition of the change-over of the opening and closing of the shutters provided on the right and left optical paths in the state where one of the shutters is set in an open (transparent) state while the other shutter is set in a closed (nontransparent) state. In addition, 3D image-taking operation is performed by alternately changing over the opening and closing of the shutters provided on the right and left optical paths.

Then, at the time of 2D image-taking, the setting of the slow shutter mode is allowed. At the time of 3D image-taking, the slow shutter inhibition image-taking mode is set as shown in the above-mentioned embodiment.

Figure 3:
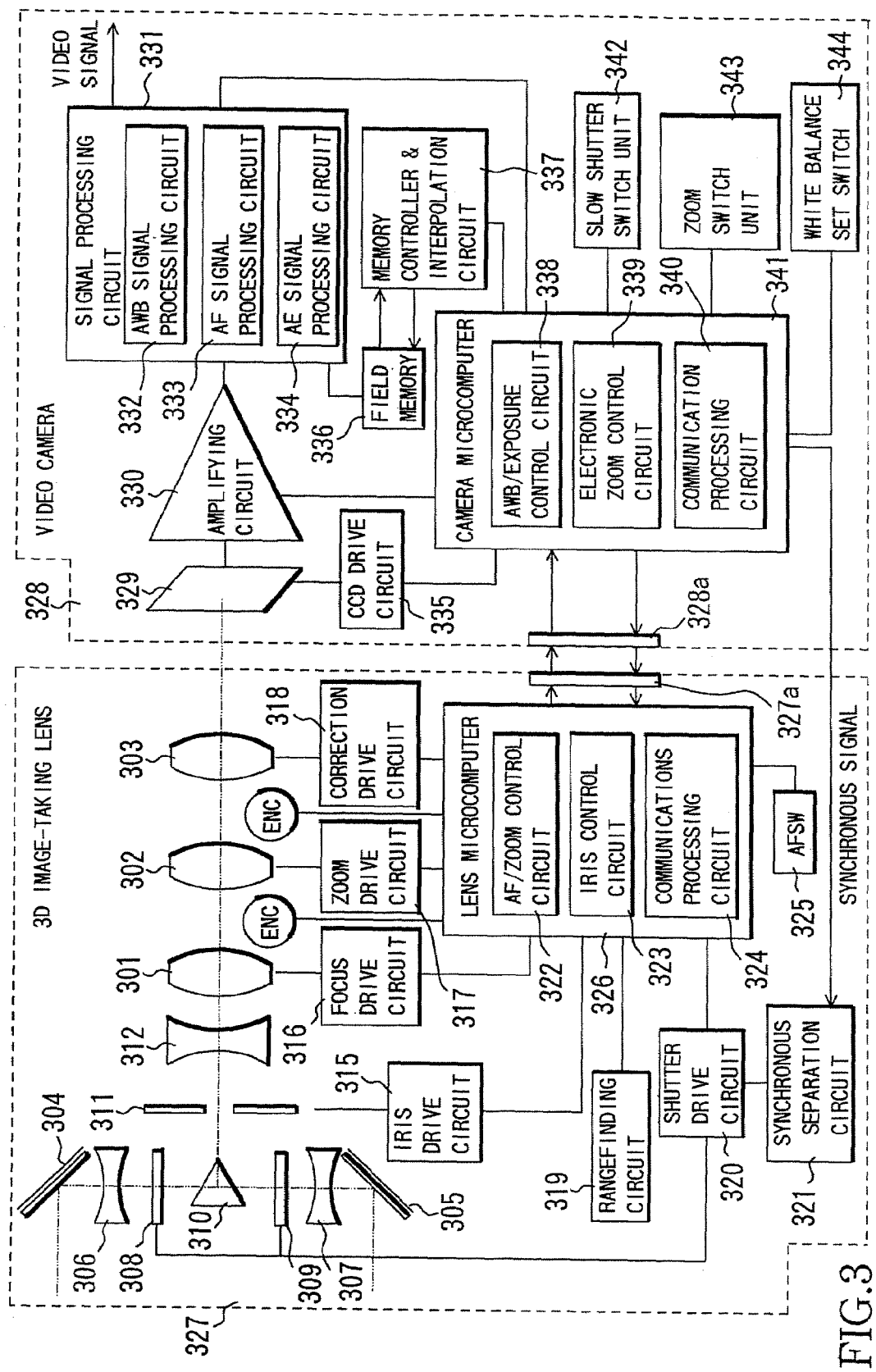
FIG. 3 is a block diagram showing the construction of a stereoscopic image-taking system according to Embodiment 2 of the present invention.

FIG. 3 is a view showing a structure of a stereoscopic image-taking system according to Embodiment 2 of the present invention. This stereoscopic image-taking system comprises of a stereoscopic (3D) image-taking lens apparatus 327, and a video camera 328 as an image-taking apparatus to which this detachable lens apparatus 327 is affixed.

The lens apparatus 327 and the video camera 328 constitute a stereoscopic image-taking system which enables temporary attachment of the lens and mutual communications with a mechanical connection of unillustrated mounts and electrical contact of the contact blocks 327*a* and 328*a* which is regulated in a predetermined format.

The contact block 327*a* of the lens apparatus 327 and the contact block 328*a* of the camera 328 come into contact with each other by the attachment of the lens mount on the camera mount. As a consequence, the lens microcomputer 326 as a control circuit and the camera microcomputer 341 can perform predetermined data communications in accordance with the predetermined format. Furthermore, electric power is supplied to the lens apparatus 327 from the camera 328 via the contact blocks 328*a* and 327*a*.

The image-taking optical system of the lens apparatus 327 forms right and left optical paths. The front side optical system out of the image-taking optical system comprises of right and left object mirrors 304 and 305, the right and left first lens units 306 and 307, and the right and left liquid crystal shutters 308 and 309 and a prism 310.

Light rays incident on the right and left optical paths, respectively, from the object are reflected by the object mirrors 304 and 305 to pass through the first lens units 306 and 307 and alternately reach the prism 310 by an opening and closing operation (transparent and nontransparent) of each of the liquid crystal shutters 308 and 309.

Here, the liquid crystal shutters 308 and 309 cannot allow incident light to completely transmit throughout in the transparent state, and a small amount of shielded light exists. On the other hand, in the nontransparent state, the incident light cannot be shielded completely, and some amount of transmitting light exists. However, in this embodiment, the state in which the majority of incident light is allowed to transmit throughout is referred to as a transparent state or an open state whereas the state in which the majority of incident light is shielded is referred to as a nontransparent state or a closed state.

Further, drive of the object mirrors 304 and 305 is controlled by a lens microcomputer 326 by means of the motor in accordance with a distance to the object detected with the rangefinding circuit 319. As a consequence, the vergence of the right and left optical axes is adjusted in accordance with the distance to the object.

Furthermore, drive of the focus lens with the motor is controlled by the lens microcomputer 326 in accordance with the distance to the object detected by the rangefinding circuit 319, and the focus is adjusted in accordance with the distance to the object.

The right and left light fluxes which have reached prism 310 are reflected by the prism 310 and have a common optical axis to be incident on the rear side optical system out of the image-taking optical system. This rear side optical system comprises of an IRIS 311 for adjusting the light amount, the second lens unit 312 which is fixed, a focus lens 301 which is the third lens unit for focusing, a zoom lens 302 which is the fourth lens unit for changing a magnification, and a correcting lens 303 which is the fifth lens unit for performing a temperature focus correction and a flange back adjustment.

The light emitted from the lens apparatus 327 through the correcting lens 303 forms an image on the image-pickup element 329 such as a CCD or the like, provided in the camera 328. The image-pickup element 329 photo-electrically converts an optical image and output image signals in accordance with color components such as red, green and blue.

The image signals of the respective color components which are output from the image-pickup element 329 are amplified to an appropriate level, respectively, at the amplifying circuit 330 to be input to the signal processing circuit 331. In the signal processing circuit 331, the input image signals are converted to standard color television signals. Furthermore, the image signals are input to the AWB (auto white balance) signal processing circuit 332, provided in the signal processing circuit 331, an AF (auto focus) signal processing circuit 333 and an AE (auto exposure) signal processing circuit 334.

The AWB signal processing circuit 332 creates a color difference signal SAWB from the input image signal. This color difference signal SAWB is supplied to the AWB/exposure control circuit 338 in the camera microcomputer 341 for generally controlling the system. The AWB/exposure control circuit 338 controls the amplifying circuit 330 so as to set the color difference signal SAWB to zero, thereby controlling the setting of the white balance while sending the control information to the lens microcomputer 326.

Furthermore, the AE signal processing circuit 334 creates a photometric signal SAE from the input image signal. The photometric signal SAE is sent to the AWB/exposure control circuit 338 to be used for the exposure control. Furthermore, a command of the photometric region control for selectively photmetering only a partial region within the image-taking field is sent to the AE signal processing circuit 334.

The AWB/exposure control circuit 338 controls the exposure, and the CCD drive circuit 335 is driven, so that the exposure state of the photometric signal becomes a desired state, thereby controlling the charge-storage time of the image-pickup element 329 and the gain of the amplifying circuit 330. Furthermore, the AWB/exposure control circuit 338 sends a command of the aperture driving to the IRIS control circuit 323 of the lens microcomputer 326. The IRIS drive circuit 315 controls the opening and closing of the IRIS 311 in accordance with the aperture stop drive command. Furthermore, the IRIS control circuit 323 detects the light amount passing through this IRIS 311 and the actual movement of the IRIS 311 to perform the feed-back loop control of the IRIS 311.

The feed-back loop control of the IRIS 311 is performed in such a manner that the IRIS drive circuit 315 drives the unillustrated IG meter in accordance with the aperture stop drive command sent from the camera 328, and the aperture state which is driven is detected by an unillustrated encoder, and an output signal of the encoder is transmitted to the AWB/exposure control circuit 338 in the camera microcomputer 341.

Furthermore, the AWB/exposure control circuit 338 controls the slow shutter function used at the time of image-taking of an object having a low illuminance. That is, the AWB/exposure control circuit 338 controls the CCD drive circuit 335 in accordance with the slow shutter speed which is selected by the slow shutter switch unit (operation switch) 342 provided on the camera 328. The charge-storage time (electronic shutter speed) of the image-pickup element 329 is changed to be longer than the normal charge-storage time which is regulated in the color television method ($\frac{1}{60}$ of a second in the NTSC method and than $\frac{1}{50}$ of a second in the PAL method) charge-storage time, whereby an image signal is intermittently extracted by synchronizing a read-out cycle thereto. Incidentally, the charge-storage time changes with the electronic shutter, however, the read-out cycle is constant.

The read intermittent image signal is taken into the field memory 336 as a video signal through the signal processing circuit 331. Then, the AWB/exposure control circuit 338 controls the memory controller and interpolation circuit 337 to transfer a video signal stored in the field memory 336 to the signal processing circuit 331 and compensate for the video signal in the field in which the read-out cycle period is omitted.

The AWB/exposure control circuit 338 controls the exposure and the slow shutter. And the AWB/exposure control circuit 338 sends electronic shutter information such as exposure information, amplification rate information such as AGC, aperture control information, selected program mode information and read-out cycle information at the time the slow shutter to the lens microcomputer 326.

In a case where an automatic focus adjustment is made at the time of 3D image-taking, the lens microcomputer 326 uses a signal from the rangefinding circuit 319 provided on the lens apparatus 327 to measure a distance to the object by means of the trigonometric survey method. Then, the AF/zoom control circuit 322 in the lens microcomputer 326 outputs a control signal to the focus drive circuit 316 on the basis of data sent from the AF signal processing circuit 333 in the camera 328 to drive the focus lens 301. The position information of the focus lens 301 can be detected by an unillustrated encoder to drive the focus lens 301 to the position at which the object is focused. An appropriate AF operation can be conducted by performing this sequence of feed-back loop controls.

Furthermore, the camera microcomputer 341 sends control data calculated at the zoom control circuit 339 on the basis of the tele-/wide data from the zoom switch unit 323 provided on the camera 328, to the lens microcomputer 326. The AF/zoom control circuit 322 in the lens microcomputer 326 sends a control signal to the zoom drive circuit 317 so as to drive the zoom lens 302 on the basis of the control data from the camera microcomputer 326 in a direction in which the tele-/wide switch is pressed in the zoom switch unit 324 thereby the zoom lens 302 is driven. As a consequence, a changing magnification operation is performed. The position of the zoom lens 302 can be detected by an unillustrated encoder, and feed-back driving can also be performed.

Furthermore, a vertical synchronous signal is output from the camera microcomputer 341 and is input to the synchronous separation circuit 321 provided on the lens apparatus 327. The synchronous separation circuit 321 separates the input vertical synchronous signal to create a desired trigger signal and to send the trigger signal to the shutter drive circuit 320.

This trigger signal and a right and left identification signal created at the lens microcomputer 326 are input to the shutter drive circuit 320. The shutter drive circuit 320 controls to open (transparent) one of the two shutters 308 and 309 while closing (nontransparent) the other shutter. As a result, images formed by the right and left optical paths are alternately formed on the image-pickup element 329, and the right and left parallax images are alternately formed with the image-pickup element 329. That is, a stereoscopic image-taking operation of the field sequential method is performed in which the right and left parallax images are formed at every time cycle of the vertical synchronous signal (1/60 of a second in the NTSC format and 1/50 of a second in the PAL format).

Furthermore, 2D image-taking operation can be performed in a state in which one of the shutters 308 and 309 is closed with the result that the 2D/3D can be easily changed over.

Further, in the present embodiment, the camera microcomputer 341 outputs a vertical synchronous signal. However, the video signal output from the signal processing circuit 331 can be made as a vertical synchronous signal.

The communications processing circuit 324 of the lens microcomputer 326 and the communications processing circuit 340 of the camera microcomputer 341 performe communications for each of the image-taking fields (60 times per one second in the NTSC format and 50 times per one second in the PAL format). The white balance control in the lens apparatus 327 and in the camera 328 at this time will be explained by using the flowchart shown in FIG. 4.

When the power source of the camera is turned on to supply power to the lens apparatus 327 as well, this sequence is started. First, at step (abbreviated as S in the figure) 401, the camera microcomputer 341 initializes data required for the white balance control to output the RWB control data and BWB control data.

Subsequently, the camera microcomputer 341, in step 402, performs the reset/start of the control timer for controlling the white balance control in terms of time. This control timer is suspended when a predetermined period of time is counted.

Next, at step 403, the camera microcomputer 341 reads the color data in each of the image-pickup regions obtained by dividing the whole image-pickup surface of the image-pickup element 329 into 64 sections. Then, at step 404, it is judged from the read-in color data as to whether each of the divided image-pickup regions is white or not.

Furthermore, at step 405, it is judged as to whether a white image-pickup region exists in 64 divided image-pickup regions. When the white image-pickup region does not exist, the process proceeds to step 406 to fix the RWB control data.

On the other hand, in the case where the white image-pickup region exists at step 405, the process proceeds to step 407 so as to calculate the average value of the color data in the divided image-pickup region which is judged to be white.

Next, at step 408, it is judged as to whether the calculated average value exists in the predetermined high color temperature region in the R-Y region and B-Y region. When the value exists in the predetermined high color temperature region, the process proceeds to step 411, a predetermined amount is added to the present RWB control data.

Furthermore, when the value does not exist in the predetermined high color temperature region at step 408, the process proceeds to step 409 so as to judge whether or not the average value calculated at step 407 exists in the predetermined low color temperature region.

When the average value exists in the predetermined low color temperature region, the predetermined amount is decreased from the present RWB control data at step 410. At step 409, the average value calculated at step 407 does not exist in the predetermined low color temperature region, the process proceeds to step 406.

In the present embodiment, in a case where a request flag for changing the adjustment allowance of the white balance is set by communication from the lens apparatus 327, the threshold value of the temperature region used for the judgment at steps 408 and 409 will be alleviated. The details thereof will be described later.

At step 413, the BWB control data will be calculated from the determined RWB control data. Furthermore, at step 414, these RWB control data and BWB control data are output.

At step 415, the control data output at step 414 is stored. Furthermore, at step 416, it is judged as to whether the control timer which starts counting at step 402 is finished counting so as to be suspended. When the control timer is not suspended, the judgment will be repeated again. Then, when the control timer is suspended, the process returns to step 402. The control cycle of the white balance is set to be constant by this control timer.

Next, the set allowance of the white balance at the time of 3D image-taking in the present embodiment will be explained by using FIG. 5 through FIG. 7.

Figure 5:
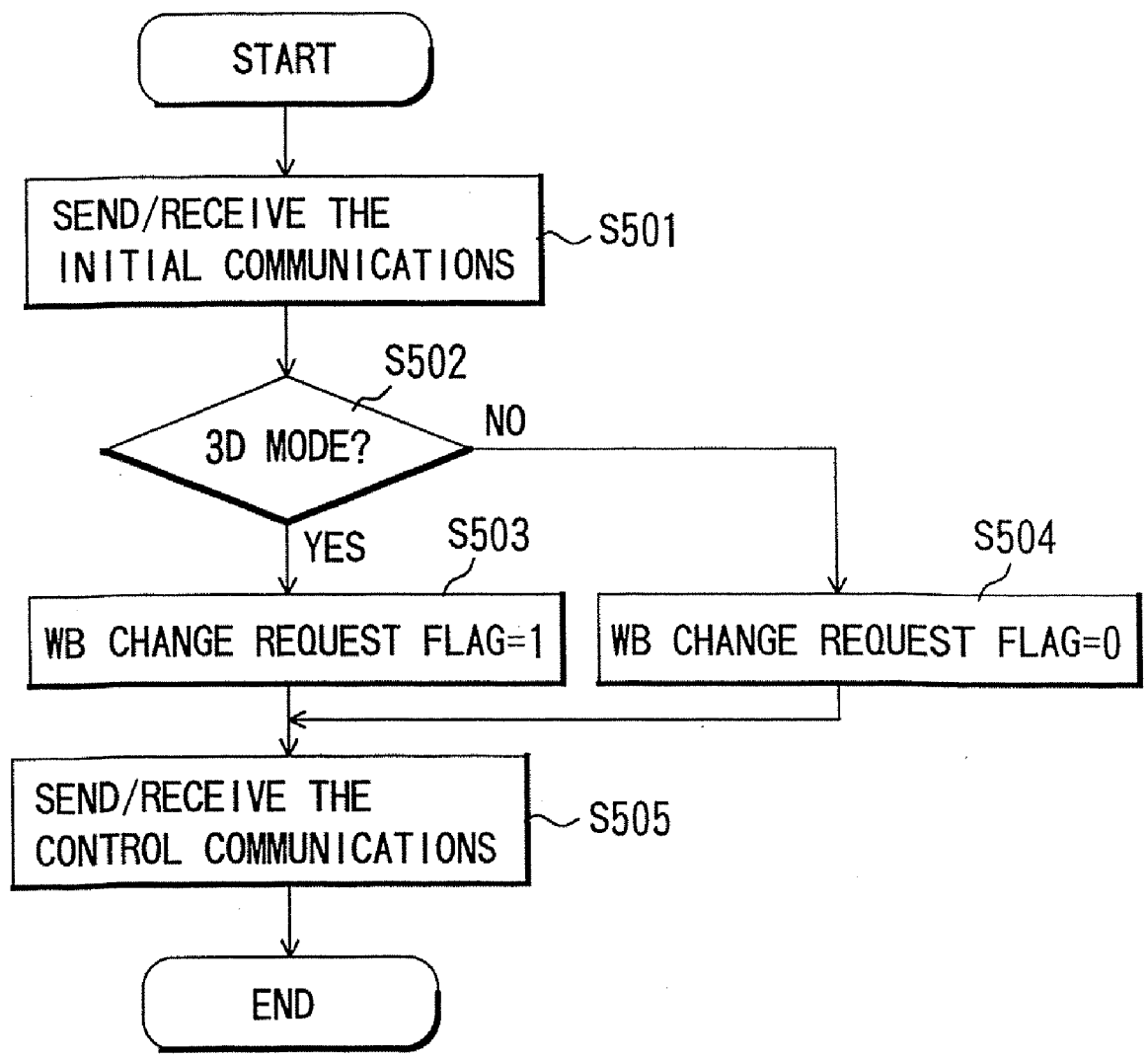
FIG. 5 is a flowchart showing the operation sequence in the stereoscopic image-taking system according to Embodiment 2 of the present invention.

FIG. 5 shows a flowchart concerning the setting of the set allowance of the white balance out of the communications operation in the lens apparatus 327.

The lens microcomputer 326 performs initial communications with the camera microcomputer 341 at step 501 immediately after the lens apparatus 327 is attached to the camera 328. At this time, the lens microcomputer 326 sends each kind of data such as the lens version information, focal length and variable magnification to the camera microcomputer 341.

Furthermore, from the camera 428 as well, each kind of data such as the camera version information, and flange back adjustment value or the like is sent, and the lens microcomputer 326 receives this data.

At step 502, the lens microcomputer 326 judges whether or not the camera 328 is set to the 3D image-taking mode. When the 3D image-taking mode is set, the process proceeds to step 503 to set a WB change request flag which shows whether or not a change in the white balance extraction range (set allowance) for the 3D image-taking is required for 1. In a case other than the 3D image-taking mode (that is, when the 2D image-taking mode is set), the process proceeds to step 504 to set the WB change request flag to 0.

At step 505, the lens microcomputer 326 performs the control communications including the WB change request flag which is set at steps 503 and 504. At this time, in addition to the WB change request to the camera 328, each kind of data such as the IRIS information, AF rangefinding frame size and current focal length or the like is sent from the lens microcomputer 326. Furthermore, each kind of data such as the AF evaluation value and IRIS control are received from the camera 328.

Figure 6:
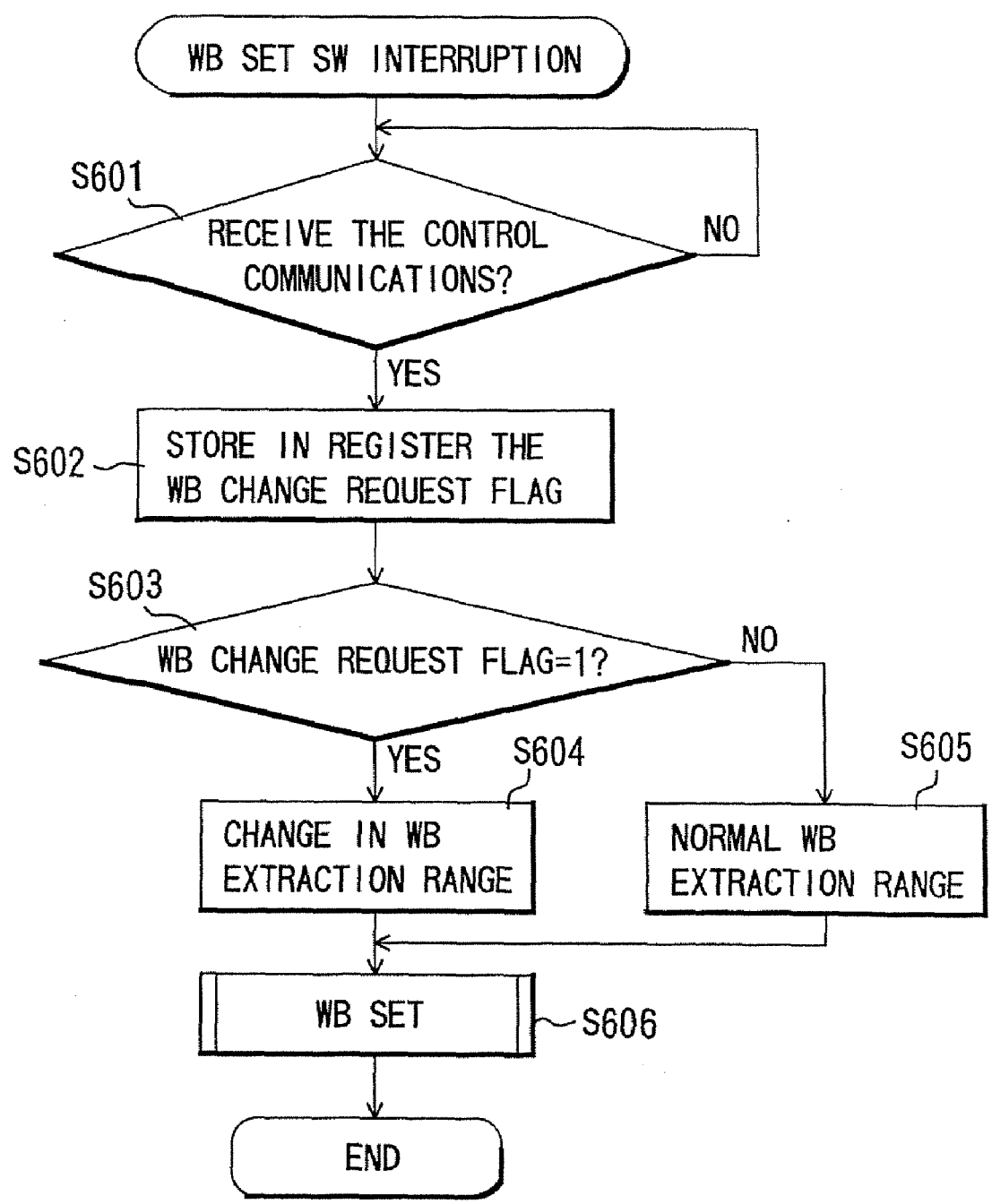
FIG. 6 is a flowchart showing the operation sequence in the stereoscopic image-taking system according to Embodiment 2 of the present invention.

FIG. 6 is a flowchart associated with the present embodiment out of the communications operation of the camera microcomputer 314. When the WB set switch 344 provided with the camera 328 is pressed for manually setting the white balance, an interruption is generated to start the processing.

First, at step 601, receipt of the control communications from the lens microcomputer 326 is confirmed. The communications between the lens apparatus 327 and the camera 328 is performed for each of the vertical synchronous periods, so that the processing is awaited until completion in the case where receipt of the control communications at step 601 is not completed.

After receipt of the control communications is completed, at step 602, the camera microcomputer 314 stores the WB change request flag which is information peculiar to the 3D image-taking out of the various items of control data in a register in the camera micro computer 314.

Then, at step 603, the WB change request flag stored in the register at step 602 is confirmed.

When the WB change request flag is set to 1, it is judged that the 3D image-taking will be performed. At step 604, the threshold value of the color temperature is changed to the WB extraction range for 3D image-taking.

On the other hand, when the WB change request flag is set to 0, the normal WB extraction range at the time of 2D image-taking is set at step 605.

Figure 4:
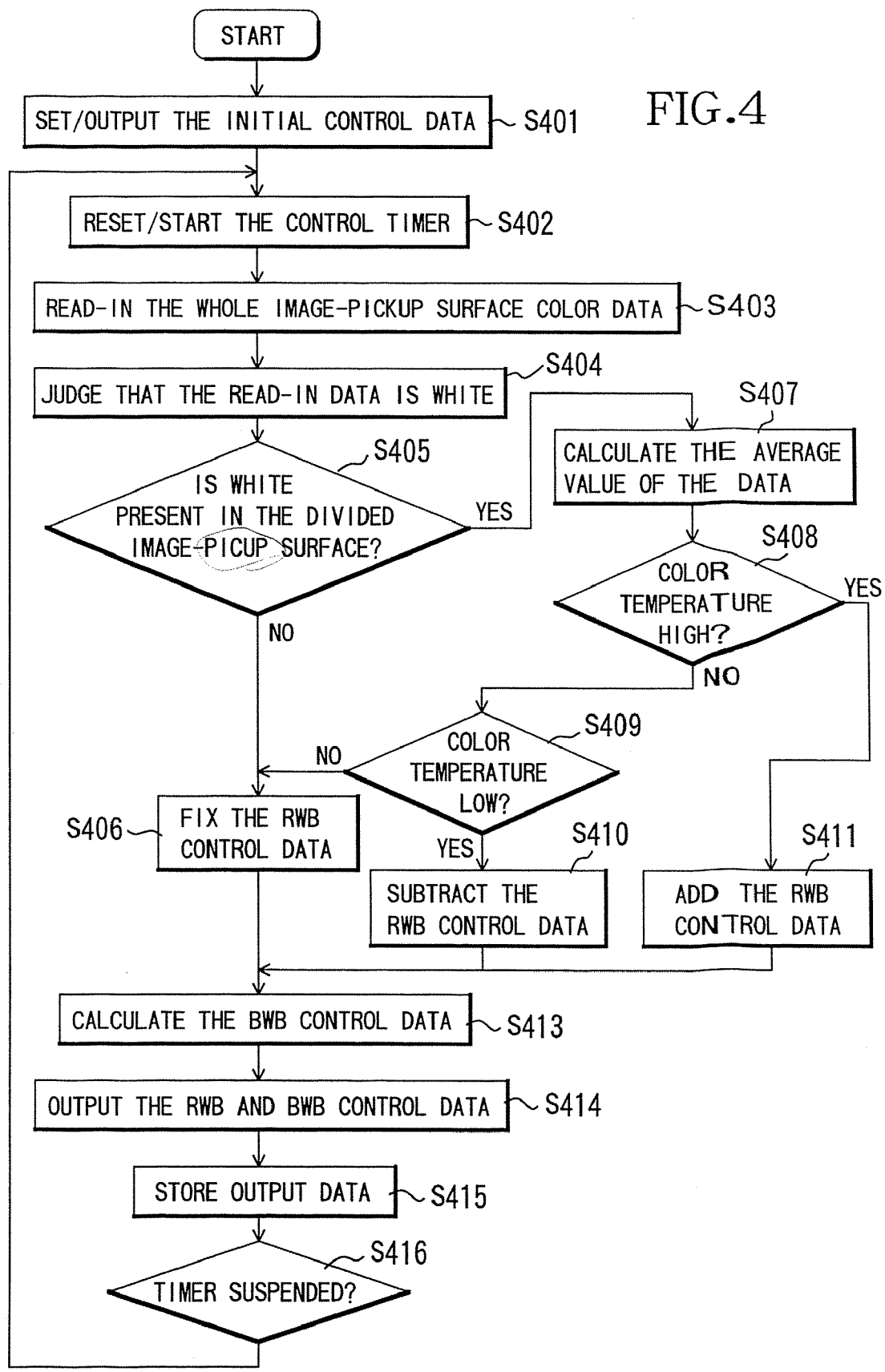
FIG. 4 is a flowchart showing an operation sequence in the stereoscopic image-taking system according to Embodiment 2 of the present invention.

Then, at step 606, the white balance setting processing explained in FIG. 4 is performed, and interruption processing is completed.

Figure 7:
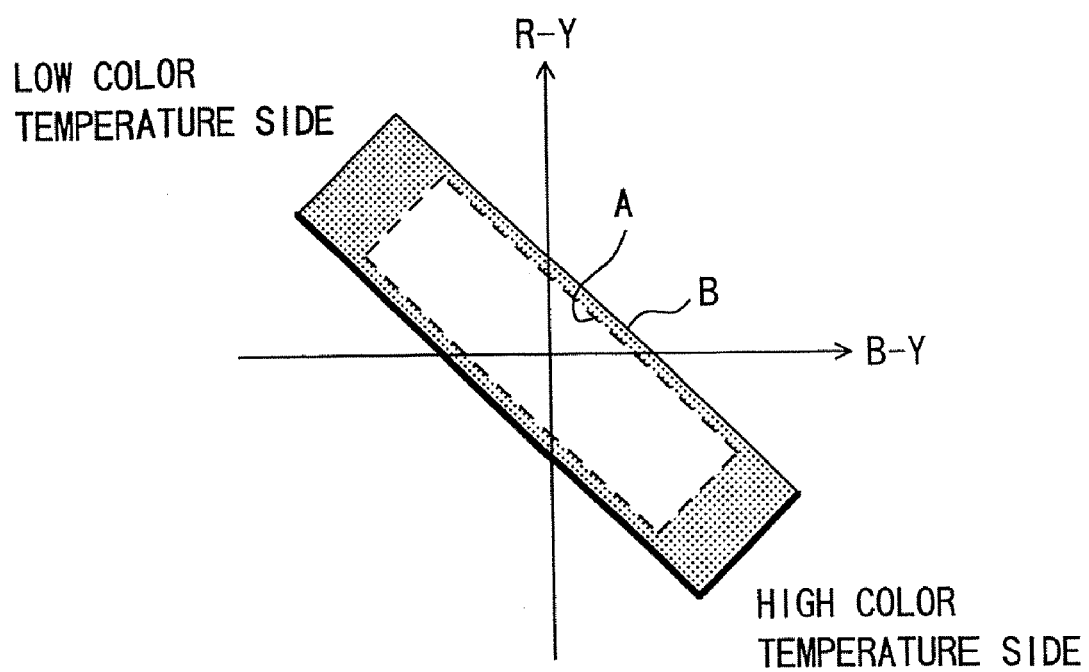
FIG. 7 is a conceptual view showing an extraction range of a white balance in the stereoscopic image-taking system according to Embodiment 2 of the present invention.
Figure 8:
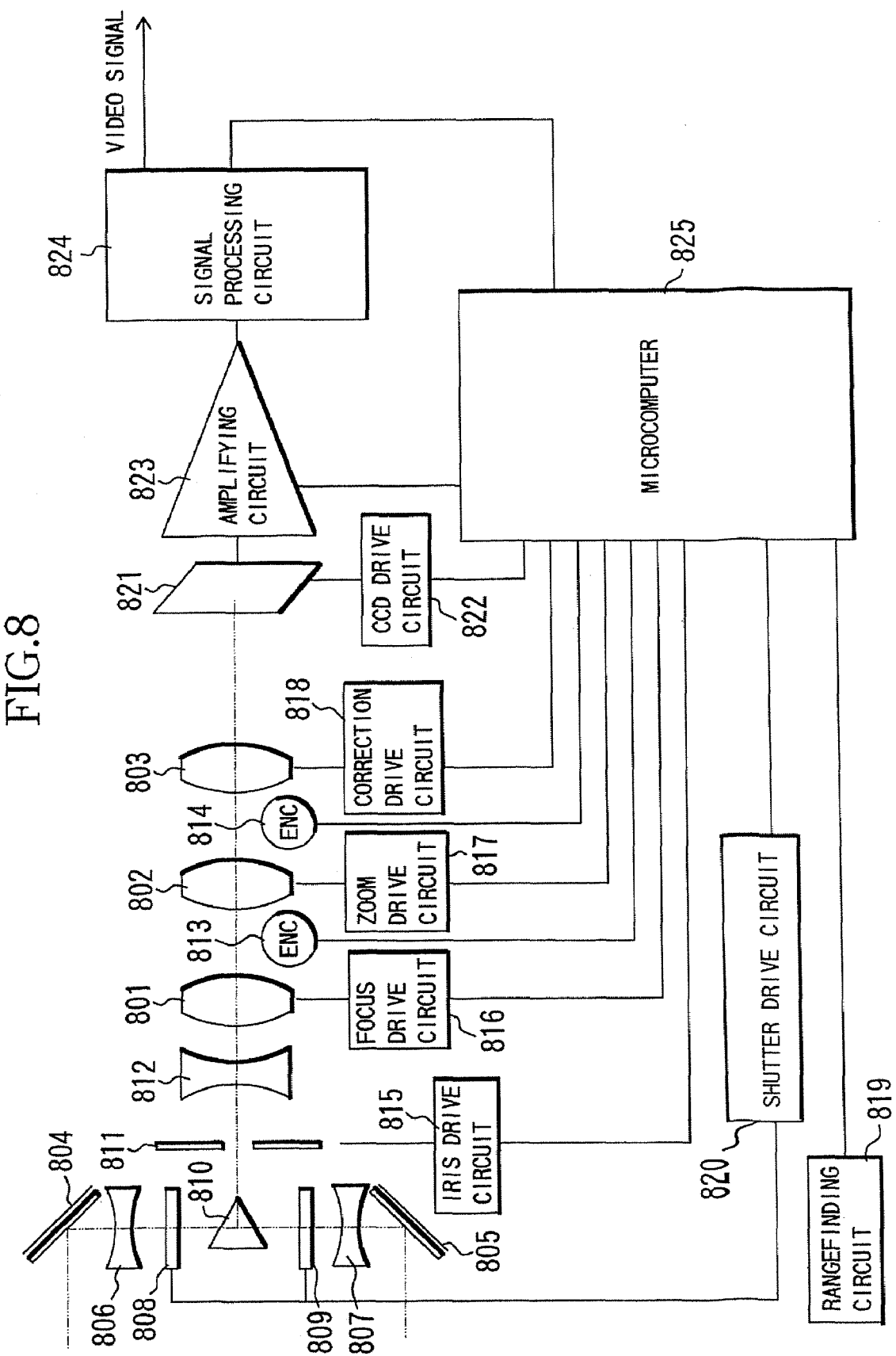
FIG. 8 is a block diagram showing a structure of a conventional stereoscopic image-taking apparatus.

In FIG. 7, an outline of the white balance extraction range is shown. In 2D image-taking, the white extraction is performed in the normal extraction range A shown by the dotted line in FIG. 7. However, in the case of 3D image-taking, it is required to perform white extraction from two color temperatures with an image signal corresponding to the right and left parallax images.

For example, when the extraction range is narrow, one of the image signals has a color temperature in the extraction range, however, a case in which the other image signal is deviated from the extraction range arises, whereby it becomes extremely difficult to adjust the white balance. Then, the extraction range is widened to the range of a thick line B in FIG. 7. That is, the extraction range is changed (expanded) so that the white balance can be easily adjust by alleviating the threshold value at the time of judgment of the color temperature at steps 408 and 409 in the flowchart of FIG. 4.

In this manner, the divergence of color difference signal is prevented at the time of the white balance control under the influence of the optical difference of the right and left object optical paths and the influence of the color difference (deviation of images) resulting from the parallax, by changing the white balance extraction range, thereby facilitating convergence of the white balance on a convergence point.

As explained earlier, according to Embodiment 2, the camera 328 to which the stereoscopic image-taking lens apparatus 327 is attached is allowed to govern the set allowance of the white balance added with the color difference of the right and left parallax images and the deviation of images. Consequently, a stereoscopic image can be obtained in which the white balance is appropriately set.

Furthermore, in the present embodiment, a stereoscopic image-taking lens apparatus using liquid crystal shutters is explained, however, the present invention can also be applied to the stereoscopic image-taking lens apparatus using a mechanical shutter (or shutters).

Furthermore, in the present embodiment, a stereoscopic image-taking system which enables exchange of the stereoscopic image-taking lens apparatus is explained, however, the present invention can also be applied to a image-taking apparatus integrated with the stereoscopic image-taking lens. In this case, one of the shutters provided on the right and left optical paths is set in an open (transparent) state while the other shutter is set in a closed (nontransparent) state, so that the opening and closing change-over is not performed, whereby 2D image-taking operation is performed. Furthermore, 3D image-taking operation can be performed by alternately changing over the opening and closing of the shutters provided on the right and left optical paths.

Then, at the time of 3D image-taking, the extraction range of the white balance can be changed with respect to 2D image-taking.

While preferred embodiments have been described, it is to be understood that modification and variation of the present invention may be made without departing from the sprit or scope of the following claims.

What is claimed is:

1. A stereoscopic image-taking lens apparatus which is attachable to an image-taking apparatus provided with an image-pickup element, comprising:

an optical system which forms right and left optical paths for guiding light from an object, which has entered said right and left optical paths, to said image-pickup element;

a shutter which is changed over so as to guide the lights which have respectively entered the right and left optical paths alternately to said image-pickup element;

a control circuit which changes over said shutter so that lights from said right and left optical paths are guided alternately to said image-pickup element at every predetermined time so as to allow said optical system to form parallax images in time sequence on said image-pickup element; and a communication circuit which performs communications with said image-taking apparatus;

wherein the control circuit sends a signal for inhibiting an image-taking operation in which the charge-storage time of said image-pickup element is longer than the predetermined time for changing over said shutter to the image-taking apparatus via said communication circuit.

2. The stereoscopic image-taking lens apparatus according to claim 1, wherein the predetermined time for changing over said shutter corresponds to a time regulated by the color television method.

3. The stereoscopic image-taking lens apparatus according to claim 2, wherein said predetermined time for changing over said shutter corresponds to a periodic time of a vertical synchronous signal of the taken images.

4. The stereoscopic image-taking lens apparatus according to claim 1, wherein said image-taking apparatus is provided with an operation switch for allowing an user to select the charge-storage time of said image-pickup element, and said control circuit sends to the image-taking apparatus a signal for inhibiting a selection of a charge-storage time which is longer than the predetermined time for changing over said shutter in accordance with the operation of the operation switch.

5. The stereoscopic image-taking lens apparatus according to claim 1, wherein said shutter is a liquid crystal shutter.

6. A stereoscopic image-taking system comprising:
a stereoscopic image-taking lens apparatus according to claim 1; and
an image-taking apparatus to which said stereoscopic image-taking lens apparatus is attachable and which has an image pickup element;
wherein said image-taking apparatus inhibits the image-taking operation in which the charge-storage time of said image-pickup element is longer than the predetermined time for changing over said shutter in said stereoscopic image-taking lens apparatus in accordance with an inhibition signal sent from said control circuit of said stereoscopic image-taking lens apparatus.

7. An image-taking apparatus comprising:
an image-pickup element;
an optical system which forms right and left optical paths for guiding light from an object, which has entered said right and left optical paths, to said image-pickup element;
a shutter which is changed over for guiding lights which have respectively entered said right and left optical paths alternately to said image-pickup element; and
a control circuit which changes over said shutter so that lights from said right and left optical paths are guided alternately to said image-pickup element to allow the optical system to form parallax images in time sequence on said image-pickup element at the time of 3D image-taking, and does not change over said shutter to allow said optical system to guide light incident from one of said right and left optical paths to said image-pickup element at the time of 2D image-taking;
wherein said control circuit allows, at the time of 2D image-taking, an image-taking operation in which the charge-storage time of the image-pickup element is longer than the opening time of said shutter and the control circuit inhibits, at the time of 3D image-taking, an image-taking operation in which the charge-storage time of said image-pickup element is longer the opening time of said shutter.

8. The image-taking apparatus according to claim 7, wherein the predetermined time for changing over said shutter corresponds to time regulated by the color television method.

9. The image-taking operation according to claim 8, wherein the predetermined time for changing over said shutter corresponds to a periodic time of a vertical synchronous signal of the taken images.

10. The image-taking apparatus according to claim 7, wherein an operation switch is provided for allowing the user to select the charge-storage time of said imaging element, and
said control circuit inhibits the selection of the charge-storage time which is longer than the predetermined time for changing over said shutter in accordance with the operation of said operation switch.

11. The image-taking apparatus according to claim 7, wherein said shutter is a liquid crystal shutter.

* * * * *